United States Patent
Rossmann et al.

(12) 
(10) Patent No.: US 6,760,796 B1
(45) Date of Patent: Jul. 6, 2004

(54) SMART CARD WHICH TEMPORARILY STORES TRANSACTIONS IN NON-SECURE MEMORY AND CONSOLIDATES THE TRANSACTIONS INTO SECURE MEMORY

(75) Inventors: Wolf Dieter Rossmann, Angus (GB); John G. Savage, Fife (GB)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/433,133

(22) Filed: Nov. 3, 1999

(30) Foreign Application Priority Data

Nov. 7, 1998 (GB) ............................................. 9824420

(51) Int. Cl.$^7$ .............................................. G06F 17/60
(52) U.S. Cl. ........................... 710/72; 235/380; 705/35; 711/147
(58) Field of Search ........................ 705/30–33, 36–45, 705/34–35; 235/380, 492, 379–385; 713/169; 710/72, 301; 711/147–153

(56) References Cited

U.S. PATENT DOCUMENTS

| | | | |
|---|---|---|---|
| 4,736,094 A | | 4/1988 | Yoshida ...................... 235/279 |
| 4,859,837 A | * | 8/1989 | Halpern ...................... 235/380 |
| 5,559,313 A | | 9/1996 | Claus et al. ................. 235/380 |
| 5,649,118 A | * | 7/1997 | Carlisle et al. ............... 705/41 |
| 5,682,027 A | | 10/1997 | Bertina et al. .............. 235/380 |
| 5,773,804 A | | 6/1998 | Baik .......................... 235/379 |
| 5,789,732 A | * | 8/1998 | McMahon et al. ............. 65/64 |
| 5,857,079 A | * | 1/1999 | Claus et al. .................. 705/33 |
| 5,901,303 A | * | 5/1999 | Chew ......................... 235/492 |
| 5,942,738 A | * | 8/1999 | Cesaire et al. .............. 235/380 |
| 6,012,049 A | * | 1/2000 | Kawan ......................... 705/41 |
| 6,178,507 B1 | * | 1/2001 | Vanstone .................... 713/169 |
| 6,179,205 B1 | * | 1/2001 | Sloan ......................... 235/382 |
| 6,247,644 B1 | * | 6/2001 | Horne et al. ................ 235/380 |
| 6,257,486 B1 | * | 7/2001 | Teicher et al. .............. 235/380 |
| 6,289,324 B1 | * | 9/2001 | Kawan ......................... 705/41 |
| 6,339,765 B1 | * | 1/2002 | Maher ......................... 705/41 |

FOREIGN PATENT DOCUMENTS

| | | |
|---|---|---|
| EP | 0658862 | 6/1995 |
| EP | 0720120 | 7/1996 |
| EP | 0793186 | 9/1997 |
| WO | 9113411 | 9/1991 |
| WO | 9535546 | 12/1995 |
| WO | 9710560 | 3/1997 |

* cited by examiner

*Primary Examiner*—Christopher B. Shin
(74) *Attorney, Agent, or Firm*—Gregory Welte

(57) ABSTRACT

The present invention relates to a smart card and to a method of operating the smart card in which the smart card has input/output means enabling the smart card to receive and transmit data regarding individual financial transactions. The smart card has a microprocessor which incorporates a read only memory, a random access memory and input/output ports. The smart card is able to communicate through the ports when suitably positioned within a smart card reader. The internal operations of the smart card are controlled by the microprocessor as determined by program microinstructions that are stored in the read only memory. The microinstructions include a number of application programs enabling the smart card to conduct financial transactions, other related applications and transaction logging operations. The smart card has a secure area and an unsecured area within the random access memory. The microprocessor is programmed to store in the unsecured store area individual transactions which may be automated transactions using the smart card or manual transactions entered as updates into the smart card. The microprocessor is programmed to transfer transactions from the unsecured store area and consolidate them into a consolidated log of transactions in the secured area. As a result, an updated statement of cashflow is available to the user from the consolidated log.

8 Claims, 2 Drawing Sheets

SMART CARD WHICH TEMPORARILY STORES TRANSACTIONS IN NON-SECURE MEMORY AND CONSOLIDATES THE TRANSACTIONS INTO SECURE MEMORY

BACKGROUND OF THE INVENTION

The present invention relates to a smart card and to a method of operating the smart card in which the smart card has input/output means enabling the smart card to receive and transmit data regarding individual financial transactions.

Personal financial transactions can today be conducted using a wide variety of credit and debit cards. The transactions may be on-line or off-line retail purchases. Alternatively the transactions may be to withdraw cash or make financial transfers using automated teller machines or self service terminals. An even wider range of transactions has become commonplace through the advent of telephone banking whereby telephone or personal computer instructions to the relevant institution can be communicated for financial transfers and the purchase of services.

Many consumers using a wide variety of means to conduct financial transactions have no real visibility of their cashflow except from the printed receipts from machines such as point of sale (POS) terminals and automated teller machines and from monthly bank statements.

SUMMARY OF THE INVENTION

It is an aim of the present invention to provide such consumers with a more readily accessible view of cashflow.

According to the present invention there is now provided a smart card having input/output means enabling the smart card to receive and transmit data regarding individual financial transactions, a store for logging the transactions individually, and programming means to process the individual transactions so as to consolidate them into a consolidated log of transactions.

Further, according to the present invention, there is provided a method of operating a smart card having input/output means enabling the smart card to receive and transmit data regarding individual financial transactions, the method comprising logging the transactions individually and employing programming means within the smart card to process the individual transactions so as to consolidate them into a consolidated log of transactions.

The consolidated log can be accessed through the input/output means for display or printout under the control of the consumer using the smart card.

BRIEF DESCRIPTION OF THE DRAWINGS

The invention will now be described further, by way of example, with reference to the accompanying drawings in which.

DETAILED DESCRIPTION

Figure 1:
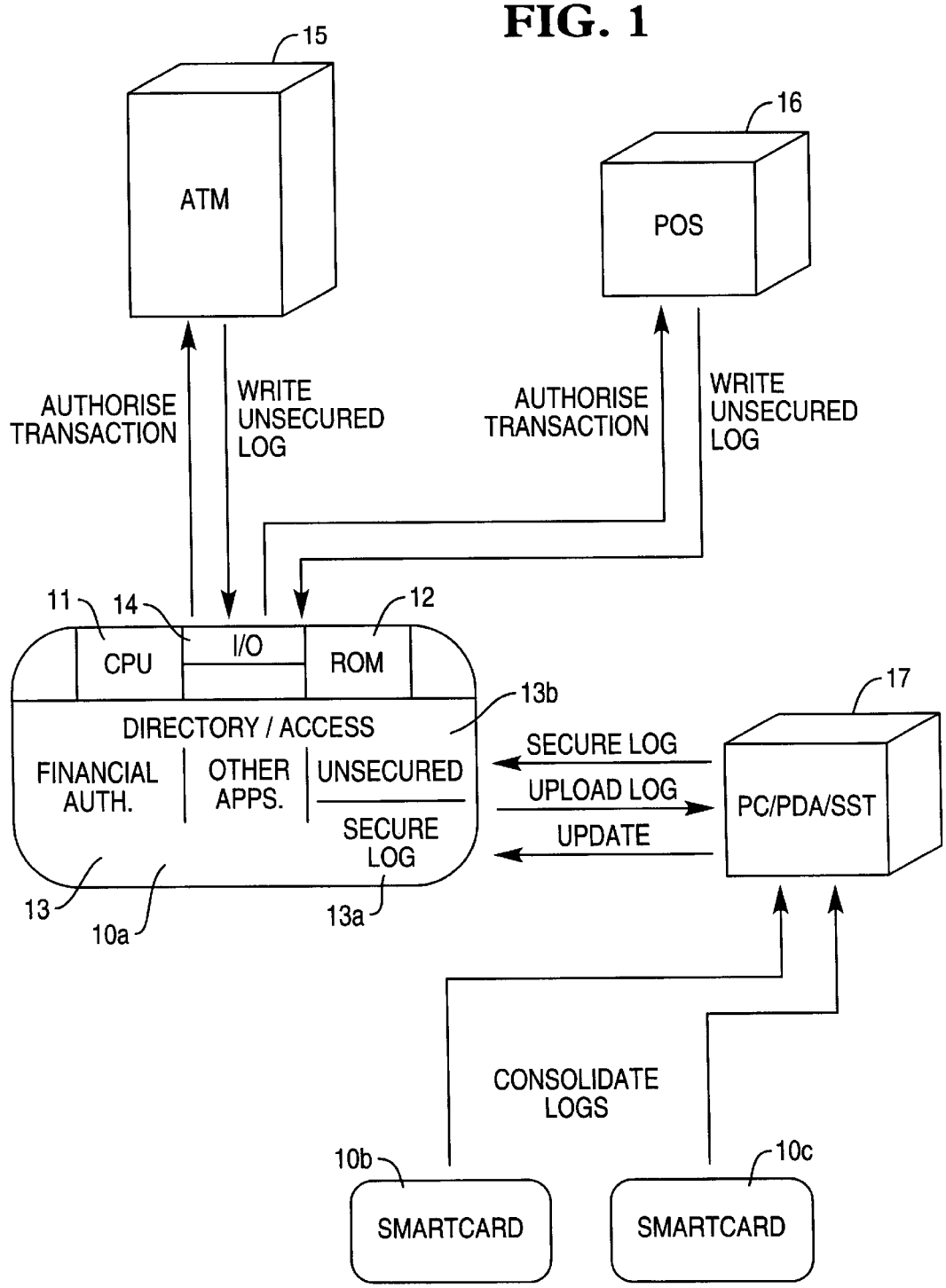
FIG. 1 illustrates smart cards, embodying the invention, communicating with a variety of devices to effect financial transactions.

In FIG. 1, a number of smart cards 10a, 10b and 10c are shown. Further detail of each smart card will be described with particular reference to smart card 10a but it will be apparent that each of the smart cards has the same general construction. As seen in FIG. 1, the smart card 10a has a microprocessor 11 which incorporates a read only memory 12, a random access memory 13 and input/output ports 14. The smart card is able to communicate through the ports 14 when suitably positioned within a smart card reader as is well known in the art. The internal operations of the smart card are controlled by the microprocessor 11 as determined by program microinstructions that are stored in the read only memory 12. The microinstructions include a number of application programs enabling the smart card to conduct financial transactions, other related applications and transaction logging operations.

Any one of the smart cards 10a, 10b or 10c can be used in conjunction with an automated teller machine 15, a point of sale terminal 16 or a data processor 17 which may be a PC, PDA or self service terminal. It will be understood that the automated teller machine 15, the point of sale terminal 16 and the data processor 17 each incorporate a smart card reader which is adapted to co-operate with the input/output ports 14 to receive instructions and data from the smart card and to pass instructions and data back to the smart card.

Each of the smart cards 10a, 10b and 10c has a secure area 13a and an unsecured area 13b within the random access memory 13. The secure area 13a is accessible under the control of the microprocessor 11 for the storage of secure data relating to a consolidate log of financial transactions. The unsecured area is accessible under the control of the microprocessor 11 for the storage of unsecured data relating to an unsecured log of financial transactions.

The smart card 10a is shown diagrammatically in FIG. 1 as co-operating with the automated teller machine 15 to conduct an automated financial transaction in which data passes between the smart card 10a and the automated teller machine 15 under the control of the application programs stored in the read only memory 12. Such transactions enable the user to withdraw currency from the machine 15 or make other financial transactions. Such other financial transactions may, for example, include the loading of currency values into the random access store 13. The smart card is programmed to receive financial data from the machine 15 into the unsecured portion 13b of the memory 13.

The smart card 10a is shown diagrammatically in FIG. 1 as co-operating with the point of sale terminal 16 to conduct an automated financial transaction in which data passes between the smart card 10a and the terminal 16 under the control of the application programs stored in the read only memory 12. A retail sale may be authorised by the smart card and the resulting financial data is written to the unsecured area 13b of the memory 13. The transactions which have been described in relation to the machines 15 and 16 and are conducted by the smart card under the control of the microprocessor 11 and will be referred to as automated transactions.

The smart cards 10a, 10b and 10c are useable with the data processing machine 17 to undertake manual transactions. Manual transactions are required in those cases where the consumer has made financial transactions without using the smart card and needs to update the financial data held in the memory 13 of the smart card. For example, the consumer may have made purchases using credit or debit cards and may have made purchases off-line over the telephone. An update from the data processing machine 17 may take a number of different forms. In the case where the machine is a personal computer, the update data can be entered from a keyboard of the personal computer; alternatively the data can have been downloaded to the personal computer from a remote site, or it can have been generated locally by a financial package. In the case where the machine is a self service terminal, the update data is prepared by the terminal to be presented to the smart card. It will be apparent that a variety of machines may be employed to update the smart card provided that they incorporate a suitable smart card reader. One such machine may, for example, be a mobile phone including a second smart card slot.

Figure 2:
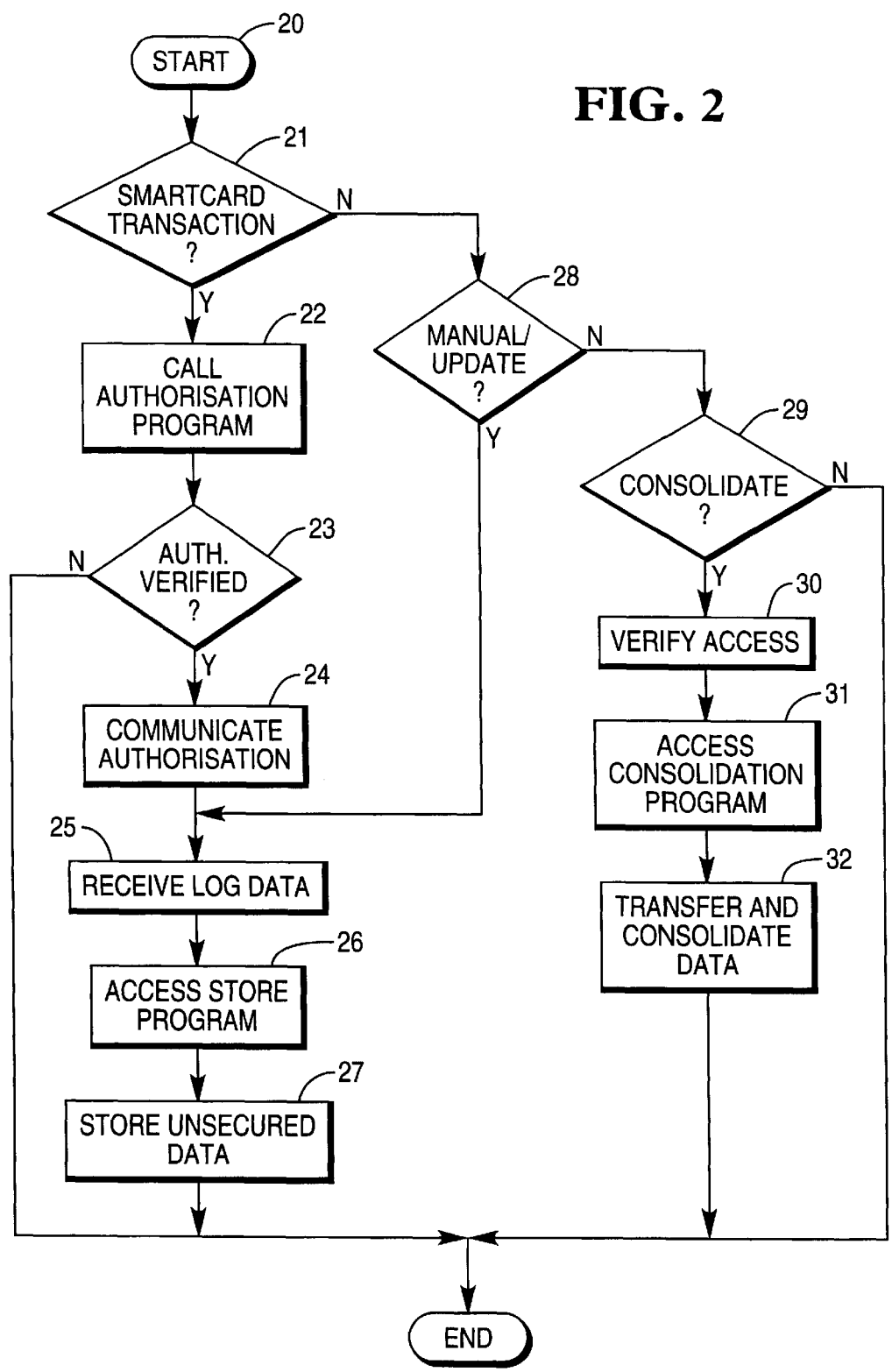
FIG. 2 shows a series of processing steps to operate a smart card embodying the present invention.

The means of operating the smart card 10a, 10b or 10c will now be described with reference to FIG. 2. The first step 20 is to enter the smart card into a smart card reader. The microprocessor 11 determines in step 21 whether an automatic transaction is called for. If so, an authorisation program is called, in step 22, from the memory 12. In step 23, the authorisation program checks the data entered from the smart card reader to determine whether a transaction should be authorised. If so, the authorisation is communicated in step 24 to the smart card reader. If the determination in step 23 is that the authorisation is not verified, the process is terminated.

In step 25, the financial transaction data is received for the unsecured transaction log 13b in the memory 13. The microprocessor 11 calls a storage program in step 26 to access the memory 13 and stores the received financial transaction data in step 27. The program terminates following step 27.

If in step 21 the determination is made that an automated transaction is not called for, the microprocessor 11 checks in step 28 whether a manual update is to be performed. If so, the microprocessor 11 proceeds to step 25 to receive the manually entered log data and proceeds through steps 26 and 27 as before.

If in step 28 the determination is made that a manual update is not called for, the microprocessor 11 checks in step 29 whether a consolidation of the financial data is called for. If so, the microprocessor 11 first verifies in step 30 the access to the secure area 13a of memory 13. The microprocessor proceeds to step 31 to access a consolidation program from the memory 12 and then proceeds to step 32 in which the data from the unsecured part 13b of the memory 13 is transferred to the secured part 13a of the memory 13. In the transfer, the microprocessor is programmed to collect and consolidate the transaction data so as to produce a consolidated statement or log of the financial transactions.

The consolidated log is accessible by uploading from the secured part of the memory 13 into the smart card reader of the data processing device 17.

It will be apparent that the manual updating of the smart card may be direct to the secured area of the memory 13 in addition to the unsecured area of the memory 13 subject to verification of such updating by the microprocessor 11.

What has been described is a smart card having the facility to conduct both automatic and manual transactions and the capability of recording financial transactions in both unsecured and secured transaction logs. A consolidation program in the smart card enables the user to conduct a consolidation of all the financial transactions so as to provide ready access to a financial statement which indicates the cashflow situation of the user.

While the invention has been described with reference to an ATM, the ATM 15 can be replaced by the more general type of self service terminal which does not have a cash dispense facility.

What is claimed is:

1. A smart card comprising:
   input/output means for enabling the smart card to receive and transmit data regarding individual financial transactions;
   a store for storing the transactions individually; and
   program means for processing the individual transactions to consolidate them into a consolidated log of transactions,
   wherein
   i) the store includes a secured area and an unsecured area, and
   ii) the program means transfers data from the unsecured area and consolidates the data into the secured area.

2. A smart card according to claim 1, wherein the program means is operable selectively either
   i) to authorize and process automated financial transactions or
   ii) to process manual transactions.

3. A method of operating a smart card having
   (A) a number of input/output ports for enabling the smart card to receive and transmit data regarding individual financial transactions, and
   (B) a memory which includes a secured area and an unsecured area, the method comprising the steps of:
   (a) logging the transactions individually in the unsecured area; and
   (b) processing the individual transactions so as to consolidate them into a consolidated log of transactions, wherein the processing includes the step of transferring transactions from the unsecured area to the secured area.

4. A method according to claim 3, further comprising the step of:
   selectively authorising and processing automated financial transactions or processing manual transactions.

5. A method of operating a smart card, comprising:
   a) maintaining a secured memory and an unsecured memory within the smart card;
   b) undertaking an automated transaction with either an Automated Teller Machine, ATM, or a Point of Sale terminal, POS, wherein the ATM or POS loads financial data into the unsecured memory;
   c) undertaking manual updating, independent of an ATM or POS, wherein data is loaded into the unsecured memory under direct control of a user; and
   d) reading data from the unsecured memory, consolidating the data, and storing consolidated data in the secured memory.

6. Method according to claim 5, wherein the data read from the unsecured memory of paragraph (d) includes (1) data automatically loaded from the ATM or POS and (2) data manually loaded by the user.

7. A smart card, comprising:
   a) a secured memory and an unsecured memory;
   b) means for undertaking an automated transaction with either an Automated Teller Machine, ATM, or a Point Of Sale terminal, POS, wherein the ATM or POS loads financial data into the unsecured memory;
   c) means for undertaking manual updating, independent of an ATM or POS, wherein data is loaded into the unsecured memory under direct control of a user; and
   d) means for reading data from the unsecured memory, consolidating the data, and storing consolidated data in the secured memory.

8. Method according to claim 7, wherein the data read from the unsecured memory of paragraph (d) includes (1) data automatically loaded from the ATM or POS and (2) data manually loaded by the user.

* * * * *